United States Patent [19]
Rummler

[11] 3,758,881
[45] Sept. 11, 1973

[54] TRANSVERSAL EQUALIZER CONTROLLED BY PILOT TONES

[75] Inventor: William David Rummler, Mendham, N.J.

[73] Assignee: Bell Telephone Laboratories, Incorporated, Berkeley Heights, N.J.

[22] Filed: Oct. 13, 1972

[21] Appl. No.: 297,497

[52] U.S. Cl. .......................... 333/16, 325/65, 333/18
[51] Int. Cl. .............................................. H04b 3/10
[58] Field of Search ........................ 325/65; 235/152; 333/16, 18, 70 T

[56] References Cited

UNITED STATES PATENTS

| | | | |
|---|---|---|---|
| 3,375,473 | 3/1968 | Lucky | 333/18 |
| 3,508,172 | 4/1970 | Kretzmer et al. | 333/18 |
| 3,659,229 | 4/1972 | Milton | 333/18 |

*Primary Examiner*—Paul L. Gensler
*Attorney*—W. L. Keefauver

[57] ABSTRACT

A transversal equalizer is controlled by harmonically related pilot tones transmitted along with the message signals. Two of the tones near the center of the transmission band differ in frequency by an amount equal to the fundamental frequency of the pilot tones. In the equalizer the two special tones are extracted from the center tap of the transversal equalizer and are used to generate amplitude and phase duplicates of the original pilot tones. At the output of the equalizer the distorted original pilot tones are separated from the message signal and subtracted from the duplicate tones, thereby creating an error signal. The control signals for the gains at each tap of the delay line of the transversal equalizer are then developed by cross-correlating the error signal with the tap voltages.

7 Claims, 4 Drawing Figures

PATENTED SEP 11 1973 3,758,881

SHEET 1 OF 2

TRANSVERSAL EQUALIZER CONTROLLED BY PILOT TONES

BACKGROUND OF THE INVENTION

This invention relates to equalizers and, more particularly, to automatic transversal filter equalizers controlled by pilot tones.

When message signals are transmitted over a communications channel, the distortion inherent in the channel will cause phase qand amplitude errors in the received signal. Equalizers are used at the receiving end of the transmission channel in order to compensate for this distortion. The use of an automatic equalizer will allow the channel to be compensated for changes which occur during transmission of the message signal. One type of equalizer which allows for this type of automatic control is the Bode, or "bump," equalizer. This type of equalizer is composed of a series of Bode networks, whose gains are individually adjusted to compensate for the channel distortion. The error signals which control the gains of the Bode network are derived by transmitting pilot tones located at the center frequency of each Bode network. When these pilot tones are received, their amplitudes are subtracted from the amplitudes of duplicates of the original pilot tones and the difference is used to generate the control signal for the Bode networks.

Although amplitude equalization can be obtained with a Bode equalizer, a transversal equalizer offers the possibility of providing additional amplitude correcting capability as well as phase equalizing capability. However, the prior art does not disclose any method for using pilot tones to adjust a transversal filter. Typically, this type of filter is adjusted by transmitting "training pulses" prior to the transmission of the message signals. At the receiver, idealized versions of the training pulses are generated and the control signals are developed by comparing the received signal with them. While this method provides a means for adjusting the transversal equalizer, it cannot be used in a continuous manner. The training pulses must be sent before the message signals or the message signals must be halted in order to transmit the training pulses. When a transversal filter is used to equalize a channel used for digital transmission only, its gain settings can also be adjusted by sampling the actual message waveforms because of their digital character. However, this technique will not provide equalization for a channel which must also carry analog signals.

Therefore, the object of this invention is to provide continuous amplitude and phase equalization of an analog channel with a transversal filter.

SUMMARY OF THE INVENTION

The present invention is directed to increasing the information handling capacity of a transmission channel which is equalized with a transversal filter. This is achieved by eliminating the training pulse period for the filter and by providing correction for both analog and digital signals. The equalizer of the present invention also has a significantly shorter response than other types of transversal equalizers.

In an illustrative embodiment of the invention, an automatically adjustable transversal filter is connected to the receiving end of a transmission channel. At the transmitting end of the channel a group of harmonically related pilot tones is introduced into the channel along with the message signals. To prevent interference, the message signals are frequency multiplexed between the pilot tones. Two of the transmitted pilot tones with frequencies near the center of the transmission band are placed so that their frequency difference equals the fundamental frequency of the pilot tones.

The transversal filter at the receiver comprises a tapped delay line, variable gain amplifiers, and a summing circuit. The unequalized signal from the channel is applied at one end of the tapped delay line. Then the signals appearing at the taps of the delay line are separately amplified and then summed to create the filter output. Changes in the gains of the amplifiers can cause the characteristics of the filter to change in such a way as to correct for any distortion of the input signal caused by the transmission media, thereby equalizing the media.

In the proposed equalizer, the gains of the amplifiers are set by control signals developed by multiplying the signals at the delay line taps by an error signal and filtering out the sum frequency terms, but retaining the difference frequency terms. To create the error signal needed in the generation of the control signals, the two pilot tones near the center of the band whose frequencies differ by the pilot tone fundamental are extracted from the center tap of the equalizer delay line. They are used by an equalization signal regenerator to create signals which are amplitude and phase replicas of the original pilot tones. At the output of the equalizer the original pilot tones, which have been degraded by a passage through the transmission media, are separated from the output signal and then subtracted from the duplicate pilot signals generated by the equalization signal regenerator. This subtraction operation generates the desired error signal.

In effect, the control signals for the tap gains are derived by cross-correlating the error signal with the signals at the taps of the delay line. This results in an adjustment of these tap gains so as to equalize the transmission media and remove the distortion in the message signals caused by the transmission media.

The foregoing and other features of the present invention will be more readily apparent from the following detailed description and drawings.

DETAILED DESCRIPTION

Figure 1:
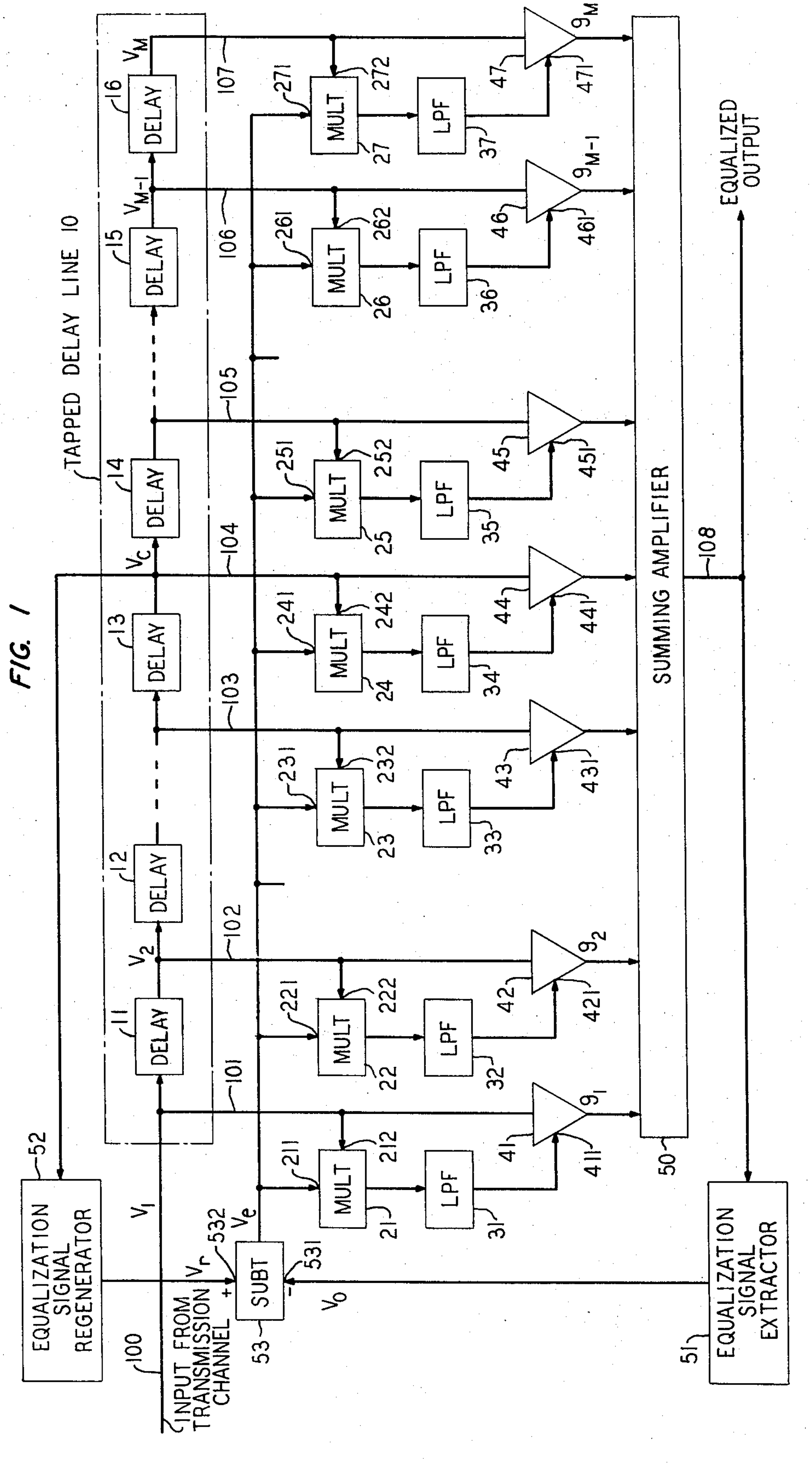
FIG. 1 is a block diagram of an illustrative embodiment of the invention.
Figure 2:
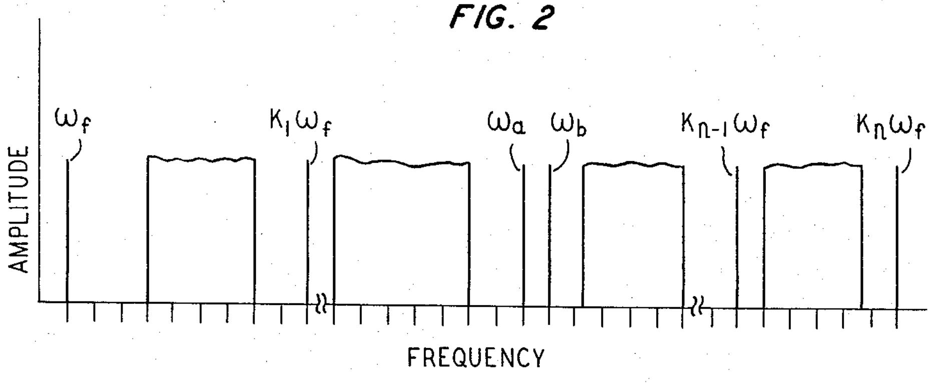
FIG. 2 is a graph of the relative locations of the pilot tones and message signals used in practicing the invention.

The arrangement shown in FIG. 1 is a transversal filter adapted according to the principles of the present invention. This transversal filter will effectively equalize a transmission channel whose output is connected to the input line 100 of the filter. The signal received on line 100 is represented by the graph shown in FIG. 2. At the transmitting end of the transmission channel the message signals and the pilot tones for controlling the equalizer are multiplexed together. The pilot tones are harmonically related and are spaced through the transmission band. Two of the pilot tones, $\omega_a$ and $\omega_b$ in FIG. 2, are located near the center of the transmission band and are spaced so that their frequency difference equals the fundamental frequency, $\omega_f$, for the pilot tones. The message signals are then located between the pilot tones. Because of this arrangement, the equalizer can be continuously adapted during message transmission, but the equalization control signals do not utilize a large portion of the transmission bandwidth.

The signal which is received on line 100 is applied to the input of tapped delay line 10. This delay line is made up of the various delay sections 11 through 16 in FIG. 1. The signal voltages appearing at the taps of the delay line are located on lines 101 through 107. These tap voltages are then separately amplified in amplifiers 41 through 47, respectively, and the amplified signals are summed in summing amplifier 50. The output of amplifier 50 on line 108 is the equalizer output.

Figure 3:
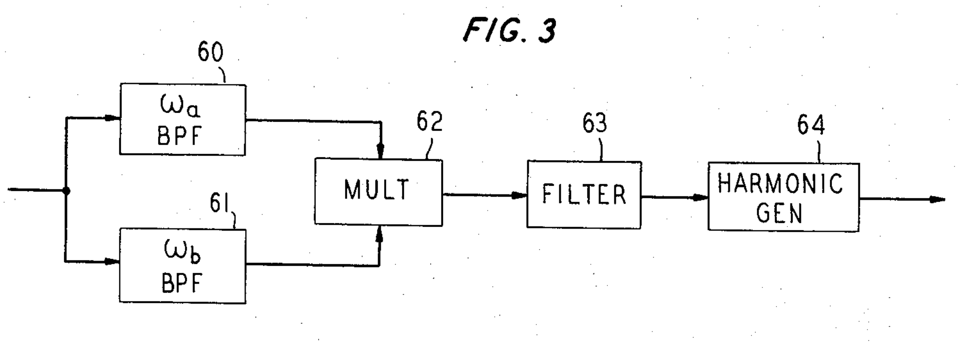
FIG. 3 is a schematic of the equalization signal regenerator of FIG. 1.

In order to control the gain settings of the equalizer, duplicates of the transmitted pilot tones are generated in equalization signal regenerator 52. This regenerator, which is connected to the center tap of the delay line, filters out the two special pilot tones $\omega_a$ and $\omega_b$ and generates duplicates of the original pilot tones from them. This is accomplished with the circuitry shown in FIG. 3. The bandpass filter 60 shown in FIG. 3 filters out pilot tone $\omega_a$ and bandpass filter 61 filters out pilot tone $\omega_b$. These two pilot tones, appearing at the outputs of filters 60 and 61, are then multiplied in multiplier circuit 62. This generates sum and difference frequency terms. Filter 63 eliminates the sum frequency terms, leaving only the difference frequency terms. Because of the special relationship between $\omega_a$ and $\omega_b$, this difference frequency term represents the fundamental of the pilot tones with the proper phase. This fundamental term is then applied to harmonic generator 64, which produces the duplicates of the original pilot tones.

Figure 4:
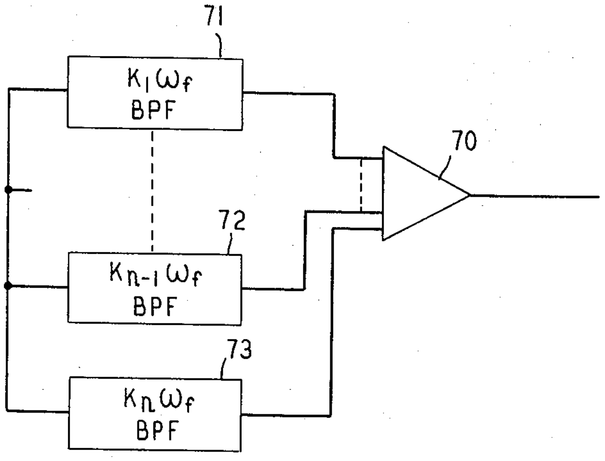
FIG. 4 is a schematic of the equalization signal extractor of FIG. 1.

At the output of summing amplifier 50 the equalization signal extractor circuit 51 separates the pilot tones which have passed through the transmission channel from the remainder of the equalizer output. This extractor circuit is shown in FIG. 4, where bandpass filters 71 through 73 filter out the pilot tone signals from the equalizer output. These pilot tones are then combined in summing amplifier 70 to generate a signal which represents the transmitted pilot tones.

Since the output of regenerator 52 represents an idealized version of the original pilot tones, $V_r$, and the output of extractor 51 represents the actual transmitted pilot tones, $V_o$, the difference between the two represents the distortion caused by the transmission channel. An error signal, $V_e$, representing this distortion, is generated in subtracting circuit 53, which is shown in FIG. 1. The output of extractor circuit 51 is applied to the negative input, 531, of subtracting circuit 53 and the output of regenerator 52 applied to its positive input, 532. The error signal at the output of subtractor circuit 53 is then applied to inputs 211, 221, 231, 241, 251, 261 and 271 of multiplier circuits 21 through 27, respectively. Inputs 212, 222, 232, 242, 252, 262 and 272 of the multiplier circuits are connected to the tap voltages located on lines 101 through 107, respectively. Therefore, the outputs of the multiplier circuits contain sum and difference frequency terms for the error voltage and the voltage at each tap. Low-pass filters 31 through 37, connected to multipliers 21 through 27, respectively, eliminate the sum frequency terms, thereby generating a signal which is equal to the cross-correlation of the error voltage and the voltage at each tap. These cross-correlation voltages are then applied to inputs 411, 421, 431, 441, 451, 461 and 471 of amplifiers 41 through 47 and effectively control their gain in such a manner as to minimize the mean-squared error voltage.

With the arrangement of FIG. 1, a transversal equalizer can be controlled by a set of pilot tones which are transmitted simultaneously with the message signals. This allows the transmission channel, which is connected to the equalizer, to be continuously corrected. The pilot tones, after passing through the transmission channel and the filter, are subtracted from the idealized version of the original pilot tones and an error signal is generated. This error signal is then cross-correlated with the voltages at the taps of the delay line and the result is used to control the gains at the taps.

This arrangement gives a steepest descent approach to the minimum error setting of the equalizer, which produces the minimum mean-squared error for the transmission channel. This can be seen by considering the equalization signal, $V_{eq}(t)$, which is inserted into a channel at IF as $$V_{eq}(t)=\sum_{n=1}^{N_e} e^{j\omega_n t} \qquad (1)$$

where $$\omega_n = k_n \omega_f . \qquad (2)$$

$N_e$ is the number of pilot tones and $k_n$ is an in integer. After transmission through a channel having a transfer function H, the equalization signal will appear at the center tap of the delay line of the transversal filter as $$V_o(t)=\frac{V_{M+1}}{2}(t)=\sum_{n=1}^{N_e} H(\omega_n)e^{j(\omega_n t-\phi_L)} \qquad (3)$$

where $\phi_L$ represents the quadrature phase error which may be introduced in frequency shifting a single sideband radio channel down to an intermediate frequency, $H(\omega_n)$ is the complex channel transfer function at $\omega_n$ referred to the center tap, and M is the number of taps in the delay line of the filter. The phase error, $\phi_L$, is removed by the equalizer.

Since the two special pilot tones ($\omega_a$,$\omega_b$) near the center of the transmission band were chosen so that $$\omega_b - \omega_a = \omega_f \qquad (4)$$

the output of the equalization signal regenerator can be determined. This is done by substituting $\omega_a$ and $\omega_b$ for $\omega_n$ in Equation (3) and solving Equation (4) by multiplying the two forms of Equation (3) together and eliminating the frequency sum terms. This yields the fundamental term which can be used to generate the reference signal $$V_r(t)=\sum_{n=1}^{N_e} e^{j\omega_n t+j\omega_n\phi} \qquad (5)$$

at the output of the equalization signal regenerator, where $N_e$ is the number of pilot tones and $\phi$ is the phase slope of $H(\omega)$ between $\omega_a$ and $\omega_b$. That is, $$e^{j\omega t\phi} = H(\omega_b)\, H^*(\omega_a)/|H(\omega_b)\, H^*(\omega_a)|$$

As may be seen from Equation (5), $\phi$ compensates for the time delay introduced by the channel, to the extent that this delay is characterized by the phase slope of $H(\omega)$ near $\omega_a$ and $\omega_b$. The arrangement of FIG. 3 performs this operation in the filter.

The output voltage of the equalizer can be determined by noting that the voltage at the $K^{th}$ tap is $$V_k(t) = V_c(t - kT + (M+1)T/2)\quad k = 1,2, \ldots ,M \tag{6}$$

where $V_c$ is the signal at the center tap and T is the time delay between taps. The equalizer output is then given by $$V_o(t) = \sum_{k=1}^{M} g_k V_k(t) = \sum_{k=1}^{M} g_k \sum_{n=1}^{N_e} H(\omega_n) e^{j[\omega_n t - k\omega_n T + (M+1)\omega_n T/2 - \phi_L]} \tag{7}$$

where $g_k$ is the gain of the $K^{th}$ amplifier. By limiting $\omega_n$ to the pilot tone frequencies we obtain the output of the equalization extractor. This is accomplished physically by the filter network of FIG. 4. With the regenerated and the actual equalization signal determined by Equations (5) and (7), it is possible to determine the error voltage, which is given as $$\epsilon(t) = V_r(t) - V_o(t) \tag{8}$$

To find the gain conditions which will minimize the mean-squared error, Equations (5), (7) and (8) are used to determine $$\delta\overline{|\epsilon(t)|^2}/\delta g_l^* = 0\quad l = 1,2,3, \ldots ,M . \tag{9}$$

This yields $$\sum_{n=1}^{N_e}\sum_{k=1}^{M} g_k e^{-j\phi_L} b_{kn} b_{ln}^* = \sum_{n=1}^{N_e} b_{ln}^* e^{j\omega_n\phi}\quad l = 1, 2, 3, \ldots M \tag{10}$$

as the set of equations that the $g_k$'s must satisfy for the mean-square error, $\overline{|\epsilon(t)|^2}$, to be a minimum, where $$b_{pn} = H(\omega_n) e^{-j\omega_n T[p-(M+1)/2]} \tag{11}$$

To show than the cross-correlation of the $l^{th}$ tap voltage with the error voltage is proportional to $\delta\overline{|\epsilon(t)|^2}/\delta g_l^*$, it is noted that the correlation is given as $$C_{l\epsilon} = \overline{\epsilon(t) V_l^*(t)} . \tag{12}$$

Using Equations (3), (7), (8) and (11), and carrying out the indicated operations yields $$C_{l\epsilon} = \sum_{n=1}^{N_e} b_{ln}^* e^{j\omega_n\phi + j\phi_L} - \sum_{n=1}^{N_e}\sum_{k=1}^{M} g_k b_{kn} b_{ln}^* \tag{13}$$

Comparing this expression with Equation (10) shows that $$C_{l\epsilon} = \delta\overline{|\epsilon(t)|^2}/\delta g_l^* \tag{14}$$

Therefore, the cross-correlation, which is performed at each tap by the multipliers and low-pass filters shown in FIG. 1, results in gain control signal which move the circuit along the gradient of the mean-squared error and gives a steepest descent approach to the minimum error setting of the equalizer.

In the operation of the equalizer the amplifier gains are actually complex. This means that each tap voltage must be split into in-phase and quadrature components, each component must be correlated with the error voltage and the output of each correlator must be used to control the gain applied to that component. Detailed analysis shows that the output of such a correlation is proportional to the partial derivative of the error with respect to the gain applied to that component. It should also be noted that the number of pilot tones selected should be one greater than the number of taps and the tap delay spacing, T, should be such that $$1/T > \beta$$

where $\beta$ is the bandwidth of the channel.

While the invention has been particularly shown and described with reference to preferred embodiments thereof, it will be understood by those skilled in the art that various changes in form and details may be made therein without departing from the spirit and scope of the invention. In particular, the equalization regeneration signal was derived from the output of the center tap of the equalizer. This is useful in a radio transmission system where it is possible that both positive and negative delay compensation will be needed because of multiple paths over which the signal can travel. However, in a cable transmission system this may not be necessary and the filter can be referenced to another tap of the delay line.

I claim:

1. Apparatus for equalizing a transmission channel for transmitting a frequency multiplexed signal, the signal comprising message signals and a plurality of harmonically related pilot tones, introduced into one end of said transmission channel, comprising:

a transversal filter connected to the other end of said transmission channel, said transversal filter comprising a tapped delay line connected to the transmission channel, a plurality of amplifying means responsive to control signals for separately amplifying the signals appearing at the taps of said delay line, and means for summing the outputs of said plurality of amplifying means to form the transversal filter output signal;

means for generating duplicates of the pilot tones introduced into the end of the transmission channel from the signal appearing at one of the taps of said delay line;

first filter means for filtering the signals at the pilot tone frequencies from the transversal filter output signal;

means for comparing the output of said first filter means with the duplicates of the pilot tones and generating an error signal related to the difference; and means for cross-correlating the error signal with the signal at each tap of the delay line to produce said control signals.

2. Apparatus as claimed in claim 1 wherein the plurality of harmonically related pilot tones is distributed throughout the bandwidth of the transmission channel, and at least two special pilot tones have frequencies near the center of the channel bandwidth, said special pilot tones differing in frequency by the fundamental frequency of the pilot tones.

3. Apparatus as claimed in claim 2 wherein said means for generating duplicates of the pilot tones comprises:

a second filter means for filtering the two special pilot tones from the signal appearing at one of the taps of said delay line;

means for multiplying the two special pilot tones together;

a third filter means for filtering the signals representing the frequency difference of the two special pilot tones from the output of said means for multiplying; and means for generating harmonics of the output signal of said third filter means having the same harmonic relationship as the pilot tones.

4. Apparatus as claimed in claim 2 wherein said means for cross-correlating comprises:

a plurality of multiplying means for multiplying two input signals, the signals at the taps of said delay line being one of the inputs of each of said multiplying means, respectively, and the error voltage being the other input of each of said multiplying means; and a plurality of fourth filter means for filtering the signals representing the frequency difference of the inputs to said multiplying means from the output of said multiplying means, said frequency difference signals being said control signals.

5. Apparatus as claimed in claim 2 wherein the number of pilot tones is at least one more than the number of taps of said delay line.

6. Apparatus as claimed in claim 2 wherein said means for generating duplicates of the pilot tones generates the duplicates from the signal appearing at the center tap of said delay line.

7. A transversal filter connected to one end of a transmission channel and being controlled by pilot tones introduced into the other end of said transmission channel, comprising:

a tapped delay line connected to the input of said transversal filter;

a plurality of amplifying means, responsive to control signals, for separately amplifying signals appearing at the taps of said delay line;

means for summing the outputs of said plurality of amplifying means, the output of said means for summing being connected to the transversal filter output;

means for generating duplicates of the pilot tones introduced into said other end of said transmission channel from signals appearing at one of the taps of said tapped delay line;

means for comparing the output signal of said transversal filter at each of the frequencies of the pilot tones with the duplicates of the pilot tones and generating an error signal related to the difference; and means for cross-correlating the error signal with the signal at each tap of the delay line to produce the control signals.

* * * * *